United States Patent
Stach

(10) Patent No.: US 6,364,280 B1
(45) Date of Patent: Apr. 2, 2002

(54) ADJUSTABLE SLOW SHIFT CONTROL UNIT

(75) Inventor: Roman Stach, Mississagua (CA)

(73) Assignee: Damir Anton Fox, Mississauga (CA)

( * ) Notice: Subject to any disclaimer, the term of this patent is extended or adjusted under 35 U.S.C. 154(b) by 0 days.

(21) Appl. No.: 09/587,057

(22) Filed: Jun. 2, 2000

(51) Int. Cl.⁷ .............................................. F16K 51/00
(52) U.S. Cl. .................................... 251/50; 137/625.69
(58) Field of Search .............................. 251/50, 51, 52; 137/625.69

(56) References Cited

U.S. PATENT DOCUMENTS

| | | | | | |
|---|---|---|---|---|---|
| 3,136,338 A | * | 6/1964 | Hamer | ......................... | 251/52 |
| 3,920,216 A | * | 11/1975 | Barnum et al. | ................ | 251/51 |
| 4,682,531 A | * | 7/1987 | Mayer | ......................... | 91/446 |
| 5,451,030 A | * | 9/1995 | Reglebrugge et al. | ........ | 251/51 |
| RE36,342 E | | 10/1999 | McFayden et al. | | |

* cited by examiner

*Primary Examiner*—John Fox
(74) *Attorney, Agent, or Firm*—Eugene J. A. Gierczak

(57) ABSTRACT

A device for controlling movement of a valve comprising first and second chambers having a fluid; passage means communicating with said first and second chambers for displacement of said fluid between said chambers through said passageway upon movement of said valve.

18 Claims, 3 Drawing Sheets

ADJUSTABLE SLOW SHIFT CONTROL UNIT

FIELD OF THE INVENTION

This invention relates to a device for controlling movement of a valve and particularly relates to an adjustable control apparatus for a hydraulic shifter. More specifically this invention relates to an adjustable slow shift control unit with built in override relief valve to control spool shifting time of a manually operated directional control valve.

BACKGROUND OF THE INVENTION

Hydraulic and pneumatic systems are heretofore known and generally includes valves with spools. There have been many control units which have been designed in order to control the introduction and rate of fluid flow within such hydraulic and pneumatic systems. It is generally desirable to minimize or eliminate hydraulic shock in a hydraulic system which can be created upon rapid shifting of the spool or valve when for example one attempts to stop the fluid flow instantly; such as for example in an emergency situation.

There have been many attempts to design slow shift control units to reduce or eliminate the hydraulic shock in a hydraulic system due to rapid shifting of the spool. Such slow shifting action extends the lifetime of the hydraulic components and tends to prevent mechanisms from breaking down.

For example one such system is shown in U.S. Pat. No. Re36,342.

However many of the slow shift control systems available in the market are of the fixed type of control which does not allow fine tuning of the valve in the hydraulic system. Moreover such prior art devices have not generally been used to control manually operated directional controlled valves.

It is an object of this invention to provide an improved slow shift control unit.

It is another object of this invention to provide a control unit which is adjustable.

SUMMARY OF THE INVENTION

It is another aspect of this invention to provide a device for controlling movement of a valve comprising first and second chambers having a fluid; passage means communicating with said first and second chambers for displacement of said fluid between said chambers through said passageway upon movement of said valve.

It is a further aspect of this invention to provide an adjustable control apparatus for a hydraulic shifter comprising first and second chambers containing a fluid; a valve means moving between a first and second position; an adjustable means for controlling the rate of communication of said fluid between said first and second chambers as said valve means moves between said first and second position.

It is a further aspect of this invention to provide a method of using an adjustable control apparatus for a hydraulic shifter having first and second chambers containing a fluid comprising moving a valve means between a first and second position; adjusting and adjustable means for controlling the rate of communication of said liquid between said first and second chambers as said valve means moves between said first and second position.

It is yet another aspect of this invention to provide a method of using an adjustable control apparatus for a hydraulic shifter having first and second chambers containing a liquid comprising moving a valve means having a lever, a spool and at least one passage between a first and second position; adjustable means for controlling the rate of communication of said liquid between said first and second chambers as said valve means moves between said first and second position by engaging said lever and said spool.

BEST MODE FOR CARRYING OUT THE INVENTION

Figure 1:
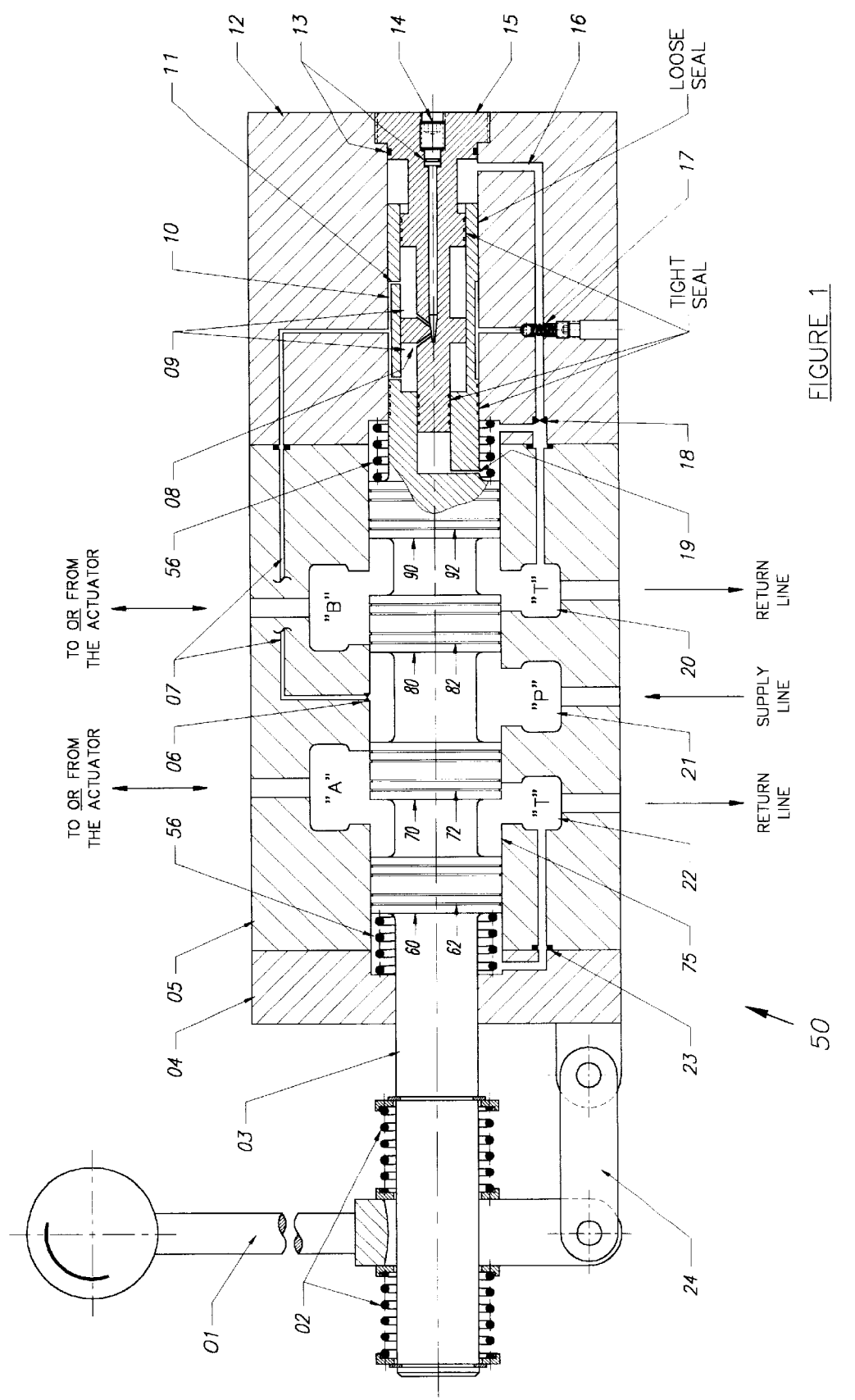
FIG. 1 illustrates the device in a neutral position.

In the description which follows, like parts are marked throughout the specification and the drawings with the same respective reference numerals. The drawings are not necessarily to scale and in some instances proportions may have been exaggerated in order to more clearly depict certain features of the invention.

Various embodiments of the invention have now been described in detail. Since changes in and/or additions to the above-described best mode may be made without departing from the nature, spirit or scope of the invention, the invention is not to be limited to said details.

The device 50 illustrated in the drawings includes the valve 3 adapted for slidable displaceable movement within a body 5. The description that follows describes the invention in relation to a valve spool 3 or spool 3, but the invention should not be limited to the spool as shown, but to the valve as claimed. The main body 5 includes a front cap 4 and an end cap 12 which are secured together by a variety of means so as to produce a substantially leak-free device. The spool 3 is adapted for axial slidable movement within the body 5 in a manner to be more fully particularized herein. The spool 3 is associated with the body 5 so as to define chambers A, B, P and T. Furthermore chambers A and B communicate with chamber T and chamber P between the various positions illustrated in the drawings by means of passages interconnecting chambers A, B, P and T as the spool 3 shifts from neutral to end positions.

In particular the spool includes a plurality of pistons and as shown in the drawings comprises of piston 60, 70, 80 and 90. Each piston 60, 70, 80 and 90 includes a plurality of grooves 62, 72, 82 and 92 as shown in the drawings which are adapted to slide within the internal bore 75.

Figure 2:
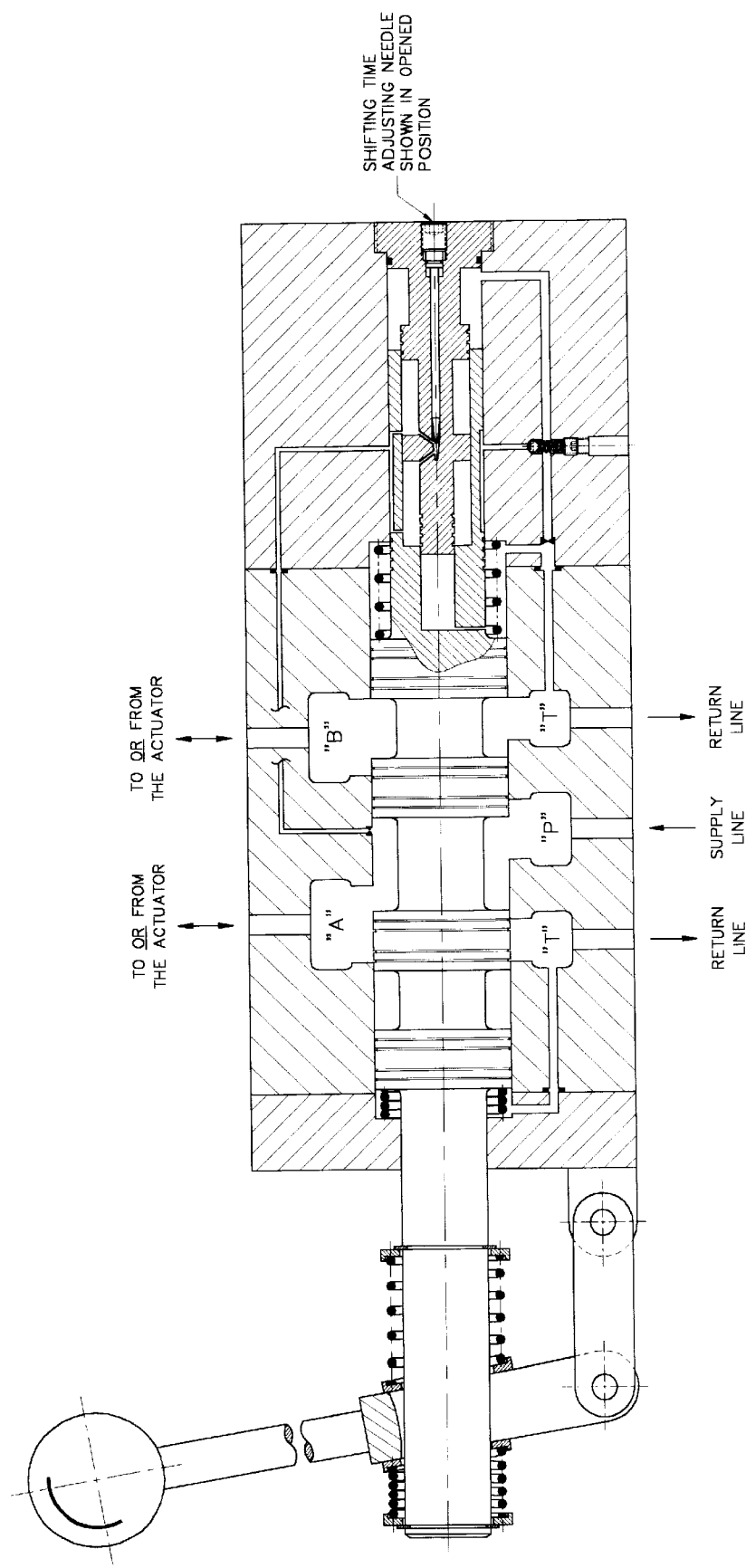
FIG. 2 illustrates the device where the lever has been pushed in the forward position.
Figure 3:
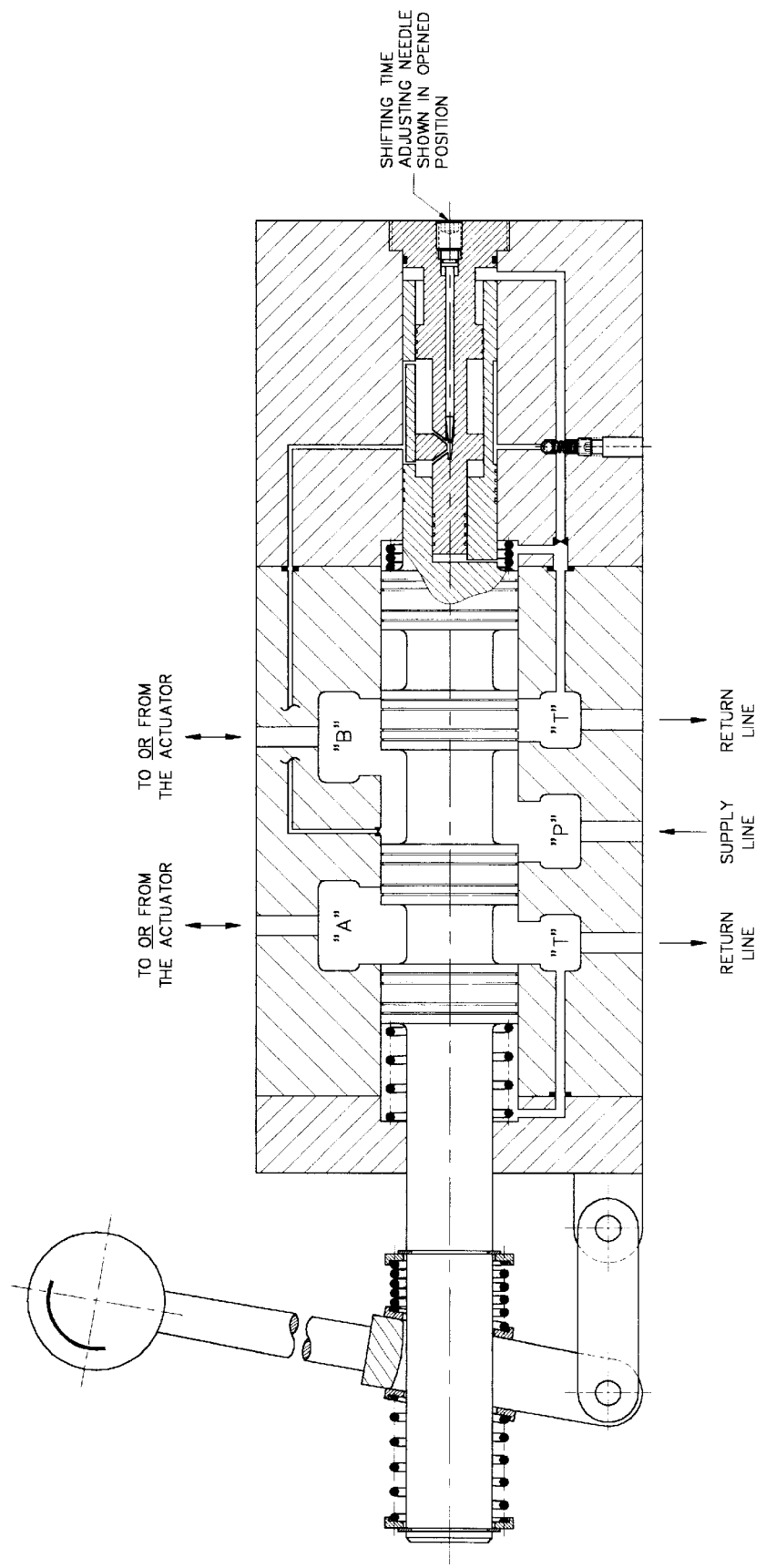
FIG. 3 illustrates the device with the lever pulled in the opposite direction.

One end of the spool 3 presents a forked lever 1 which is adapted to be moved between the positions shown in FIGS. 2 and 3.

The device 50 also includes cushioning springs 2 which are stronger than the spool's centering springs 56, so an operator can shift spool 3 using forked lever 1 in any direction in soft and cushioned motion. Springs 56 assure that the device 50 is biased in the neutral position shown in FIG. 1.

The device 50 also includes a pressure orifice 6 which communicates with oil supply passage 7. One function of the pressure orifice 6 is to reduce the oil flow to the control unit so as to provide a constant oil supply to the control chambers 9 to make up for leakages. The oil supply passage 7 directs the fluid or oil to the control unit.

The control unit includes two interconnected control chambers 9 which contain the fluid such as oil or water or the like used to control the shifting time of the spool 3 in a manner to be more fully particularized herein. The control unit also includes two plunger orifices 8 which shall be more fully described herein. The control unit is located at the end of the spool which is hollowed out so as to receive a stationery plunger as shown in the drawings. The other end of the spool 3 includes an undercut 10 or a reduced diameter of the spool. The undercut 10 is an oil distributing undercut which distributes fluid to the oil chambers 9 through spool orifices 11. There are two spool orifices 11 each communicating with the control chambers 9 respectively. The spool orifices 11 supply fluid to the control chambers 9 to compensate for leakage. Furthermore the spool orifices 11 allow the oil to circulate between the control chambers 9 in case the shifting time adjusting needle 14 to be described herein is in a closed position. This comprises a safety feature which prevents the spool 3 from stalling. Moreover the orifices 11 are calibrated so that size allows shifting of the spool 3 at a minimum speed or maximum allowable time for movement (when adjusting needle 14 is in closed position).

The control unit also includes within the plunger a shifting time adjusting needle 14. The position of the needle 14 controls the fluid flow rate between the two control chambers 9 through the plunger orifices 8. The small angle of the tapered end of the needle along with the fine thread of the opposite ends enhances the fine metering of the fluid thus providing precise control of the shifting time.

The plunger 15 houses the shifting time adjusting needle 14. Moreover the plunger 15 separates the two control chambers by the piston as shown in the drawings. The piston is integral with the plunger.

The plunger is screwed into the end of the end cap 12 and includes oil ring seals 13 to prevent leakage.

The device 50 also includes a plunger vent and drain passages 16 and 19 that vent plunger 15 allowing the spool 3 to slide along the plunger without any restrictions related to the vacuum or back pressure. Also the plunger vent and drain 16 collects any oil leakages directing them back to the tank port 20.

Accordingly the override relief valve 17 allows the operate to override the slow shift function by applying extra force to the lever 1 at any other situation.

The device 50 also includes an override relief valve 17 which is calibrated to open and vent fluid in the event that the lever 1 is quickly and suddenly pulled to either of the extreme positions, overriding the cushion action of springs 2. For example if the operator needed to stop the unit quickly and shift the spool to its neutral position then the lever could be pulled fast and hard to its extreme position causing the fluid to pass from chambers 9 through spool orifices 11 around the oil undercut 10 towards the override relief valve 17 so as to vent into the tank port 20.

Accordingly the control unit 50 slows the shifting of the spool 3 regardless of how fast the lever 1 is moved. Such function is maintained as long as the cushioning springs 2 are not completely compressed. If an operator presses the lever 1 too fast or too hard, the relief valve 17 opens bypassing the oil back to the tank port 20 through the spool orifices 11 and oil distributing undercut 10. Such situation overrides the slow shift control thus allowing controlling of the valve much faster. This action is desirable in any kind of emergency situation such as for example if the unit 50 is utilized to operate a boom which is just about to smash into a wall. Moreover an electric emergency switch killing the power supply to the hydraulic power unit will also be utilized as a backup.

The device 50 also includes an anti-drain orifice 18 which is provided to maintain a very small oil back pressure which is just enough to keep the oil inside the control unit without disturbing its function. The fluid supply to the oil distribution undercut 10 can flow back to the tank port 20 through the gap between the spool 3 and the hole in the end cap which is marked as a loose seal in the drawing. The orifice 18 should stop this unwanted extra flow.

In the slow shift control function the operator shifts the lever to a desired direction without completely compressing cushion springs 2 which causes the spool to move to the left as shown in FIG. 2. Since cushioning springs 2 are stronger than the spool centering springs 56, the spool centering spring on the left side of the drawing is compressed while the spool centering spring on the right side expands. Accordingly pistons 60, 70 and 80 move to the left, connecting chamber P with A, and chamber B with T. Moreover as can be seen from FIG. 2, the plunger 15 is stationery and the end of the spool moves towards the left as shown in FIG. 2. In this operation if the needle valve is in a closed position which means that the needle valve closes the plunger orifices 8 the fluid within the control chambers 9 will redistribute themselves or communicate between the two control chambers 9 by means of the spool orifices 11 through oil distributing undercut 10. In other words as the spool moves from FIG. 1 to FIG. 2 the fluid in one of the control chambers will pass to the other control chamber 9 by means of the spool orifices 11 and undercut 10. This will create a dashpot effect and tend to slow the movement or control of the spool valve as shown in the drawings.

However the shifting time may be adjusted by moving the adjusting needle 14. In particular the needle may be rotated so as to pull the needle towards the right as shown in FIG. 2 thereby opening the other passage between the control chambers 9 which are defined as plunger orifices 8. In other words as the needle is threaded or opened to the open position (FIG. 2) the area of communication between the control chambers 9 is increased which causes the fluid to redistribute themselves between the chambers 9 much quicker through orifices 8 and 11. Accordingly the speed of the shifting time of spool 3 depends on the size of the spool orifices 11, and the size of the passage through plunger orifices 8 set by the adjusting needle 14.

Moreover the lever 1 can be moved to the position shown in FIG. 3 which can also be utilized to adjust the speed of the shift.

Accordingly the operator shifts the lever 1 to one of the extreme positions in a desired direction without completely compressing the cushion springs 2. The cushion springs 2 are much stronger than spool 3 centering springs. The lever through the cushioning action of the spring 2 forces the spool 3 to shift in the direction as shown. If the shifting time adjusting needle 14 is closed, the oil flows between the control chambers 9 through spool orifices 11 and oil distributing undercut 10. There is one spool orifice per chamber which action causes the slow of the shift speed due to the dashpot effect. The size of spool orifices 11 could vary depending on the desired minimum shifting speed of the spool (when adjusting needle 14 is closed).

The speed of the spool shift depends on the size of the spool orifices 11 which can be calibrated to ensure the lowest spool size or the longest shifting time. However by screwing out the shifting time adjusting needle 14 the fluid has the additional passage to flow between the control chambers 9 at the flow rate set by the position of the needle. Accordingly the total fluid flow rate is a combination of the fluid flow between the spool orifices and the plunger orifices. When the shifting time adjusting needle 14 is screwed out the point where its tapered end does not obstruct the oil flow passing plunger orifices 8 the spool 3 will shift at the maximum speed or the shortest shift time Accordingly the device as described above illustrates an adjustable slow shift control unit which may be fine tuned in a controlled manner whereby the spool shift time of a mobile and industrial type hydraulic manually operated directional control hydraulic valve is exhibited.

The device as described above illustrates a slow shift control unit for reducing hydraulic shock in a hydraulic system due to rapid shifting of the spool when for example an operator stops the oil flow instantly. Such slow shifting action extends the lifetime of the hydraulic components and prevents mechanisms from breaking down. The control unit may be field adjustable so the unit allows controlling the shifting time of the manually operated mobile and industrial directional control valve.

Although the preferred embodiment as well as the operation and use have been specifically described in relation to the drawings, it should be understood that variations in the preferred embodiment could be achieved by a person skilled in the trade without departing from the spirit of the invention as claimed herein. For example the spool configuration shown is used to show the principal of operation of the adjustable slow shift control unit, and has been described for illustration purpose.

I claim:

1. A device for controlling movement of a valve within a body comprising:
   (a) first and second chambers having a fluid;
   (b) passage means communicating with said first and second chambers for displacement of said fluid between said chambers through said passageway upon movement of said valve;
   (c) a spool adapted for slideable movement within said body wherein one end of said spool is adapted to receive a stationary plunger;
   (d) said spool includes an undercut presenting first and second orifice means communicating with said first and second chambers respectively.

2. A device as claimed in claim 1 wherein said stationary plunger includes an adjustable means for adjusting the rate of communication of said fluid between said first and second chambers.

3. An adjustable control apparatus for a hydraulic shifter having a body comprising:
   (a) a valve means moving between a first and second position within said body and defining a first and second chamber containing a fluid;
   (b) an adjustable means presented by said body and co-operating with said valve means so as to control the rate of communication of said fluid between said first and second chambers as said valve means moves between said first and second position.

4. An adjustable control apparatus for a hydraulic shifter as claimed in claim 3 wherein said adjusting means for controlling the rate of communication of said fluid between said first and second chambers position, moves between a closed position and an open position.

5. An adjustable control apparatus for a hydraulic shifter as claimed in claim 4 wherein said adjustable means is an adjustable needle having a tapered end.

6. An adjustable control apparatus for a hydraulic shifter as claimed in claim 3 wherein said rate of communication between said first and second chambers decreases by moving said adjustable needle to said closed position.

7. An adjustable control apparatus for a hydraulic shifter as claimed in claim 6 wherein said rate of communication between said first and second chambers increases by moving said adjustable needle to said open position.

8. An adjustable control apparatus for a hydraulic shifter as claimed in claim 7 wherein said needle for controlling the rate of communication of said fluid between said first and second chambers is bypassed by an override relief valve when engaging said hydraulic shifter.

9. A method of using an adjustable control apparatus for a hydraulic shifter comprising:
   (a) moving a valve means between a first and second position within a body, said valve means and body defining a first and second chamber containing a fluid;
   (b) adjusting the rate of movement of said valve between said first and second position by adjustable means secured to said body for controlling the rate of communication of said fluid between said first and second chambers as said valve means moves between said first and second position.

10. A method as claimed in claim 9 wherein said first and second chambers are in constant communication with one another by passage means.

11. A method as claimed in claim 10 wherein said adjustable means is an adjustable needle having a tapered first end.

12. A method as claimed in claim 11 wherein said rate of communication between said first and second chambers decreases by moving an adjustable needle a to a first position.

13. A method as claimed in claim 12 wherein said rate of communication between said first and second chambers increases by moving an adjustable needle to a second position.

14. A method as claimed in claim 13 wherein said adjustable needle for controlling the rate of communication of said fluid between said first and second chambers is bypassed by an override valve when engaging said hydraulic shifter.

15. A method as claimed in claim 14 wherein said fluid is oil.

16. A method of using an adjustable control apparatus for a hydraulic shifter having first and second chambers containing a liquid comprising:
   (a) moving a valve means having a lever, a spool and at least one passage between a first and second position, said valve means moveable within a body and defining a first and second chamber containing a fluid;
   (b) adjustable means secured to said body for controlling the rate of communication of said liquid between said first and second chambers as said valve means moves between said first and second position by engaging said lever and said spool.

17. A device as claimed in claim 1 wherein said valve comprises a spool valve.

18. A device for controlling the movement of a valve moving between a first and second position within a body; said valve and body defining a first and second chamber containing a fluid; a plunger secured to said body; one end of said valve receives said plunger as said valve moves within said first and second position; said one end of said valve including passage means communicating with said first and second chambers; said plunger includes an adjustable needle for opening and closing said passage means so as to control the rate of communication of said fluid between said first and second chamber as said valve moves between said first and second position.

* * * * *